(12) United States Patent
Miller

(10) Patent No.: US 7,690,330 B2
(45) Date of Patent: Apr. 6, 2010

(54) AQUACULTURE RACEWAY WITH WASTE REMOVAL SECTION

(75) Inventor: Daniel J. Miller, Morgantown, WV (US)

(73) Assignee: West Virginia University

( * ) Notice: Subject to any disclaimer, the term of this patent is extended or adjusted under 35 U.S.C. 154(b) by 176 days.

(21) Appl. No.: 12/011,167

(22) Filed: Jan. 24, 2008

(65) Prior Publication Data
US 2008/0173249 A1 Jul. 24, 2008

Related U.S. Application Data

(60) Provisional application No. 60/897,078, filed on Jan. 24, 2007.

(51) Int. Cl.
*A01K 63/00* (2006.01)
(52) U.S. Cl. ..................................... 119/228
(58) Field of Classification Search ................ 119/200, 119/201, 204, 215–217, 219, 223–226, 228, 119/229, 248–250
See application file for complete search history.

(56) References Cited

U.S. PATENT DOCUMENTS

| | | | |
|---|---|---|---|
| 3,122,126 A * | 2/1964 | Yamada | 119/225 |
| 3,653,358 A | 4/1972 | Fremont | |
| 4,029,050 A | 6/1977 | Genest | |
| 4,044,720 A | 8/1977 | Fast | |
| 4,064,836 A | 12/1977 | Taborsky | |
| 4,221,187 A * | 9/1980 | Casey | 119/232 |
| 4,267,798 A * | 5/1981 | Collins | 119/229 |
| 4,688,519 A | 8/1987 | Fischer | |
| 4,798,168 A | 1/1989 | Vadseth | |
| 4,915,059 A | 4/1990 | Long | |
| 5,038,715 A | 8/1991 | Fahs | |
| 5,189,981 A * | 3/1993 | Ewald, Jr. | 119/225 |
| 5,253,610 A * | 10/1993 | Sharber | 119/215 |
| 5,305,711 A * | 4/1994 | Sharber | 119/215 |
| 5,450,818 A * | 9/1995 | Caillouet | 119/223 |
| 7,069,875 B2 * | 7/2006 | Warecki | 119/228 |
| 7,287,488 B2 * | 10/2007 | Taylor et al. | 119/219 |

* cited by examiner

*Primary Examiner*—Thomas Price
(74) *Attorney, Agent, or Firm*—Gary J. Morris

(57) ABSTRACT

Waste removal from raceways for raising aquatic animals is improved by providing a waste removal section at the downstream end of the raceways whereby the waste removal section is separated from the rest of the raceway by a vertical or near vertical screen. The mesh size of the screen is sufficient for the waste to pass through but not allow the aquatic animals to pass through. The natural flow of water through the raceway carries the waste material downstream within the raceway. A perforated pipe in the bottom of the waste removal section provides the outlet for the waste removal. A waste control valve connected to the perforated pipe controls the flow of the waste out of the waste removal section. Optional freeze protection for the waste control valve is provided.

21 Claims, 3 Drawing Sheets

AQUACULTURE RACEWAY WITH WASTE REMOVAL SECTION

Figure 1:
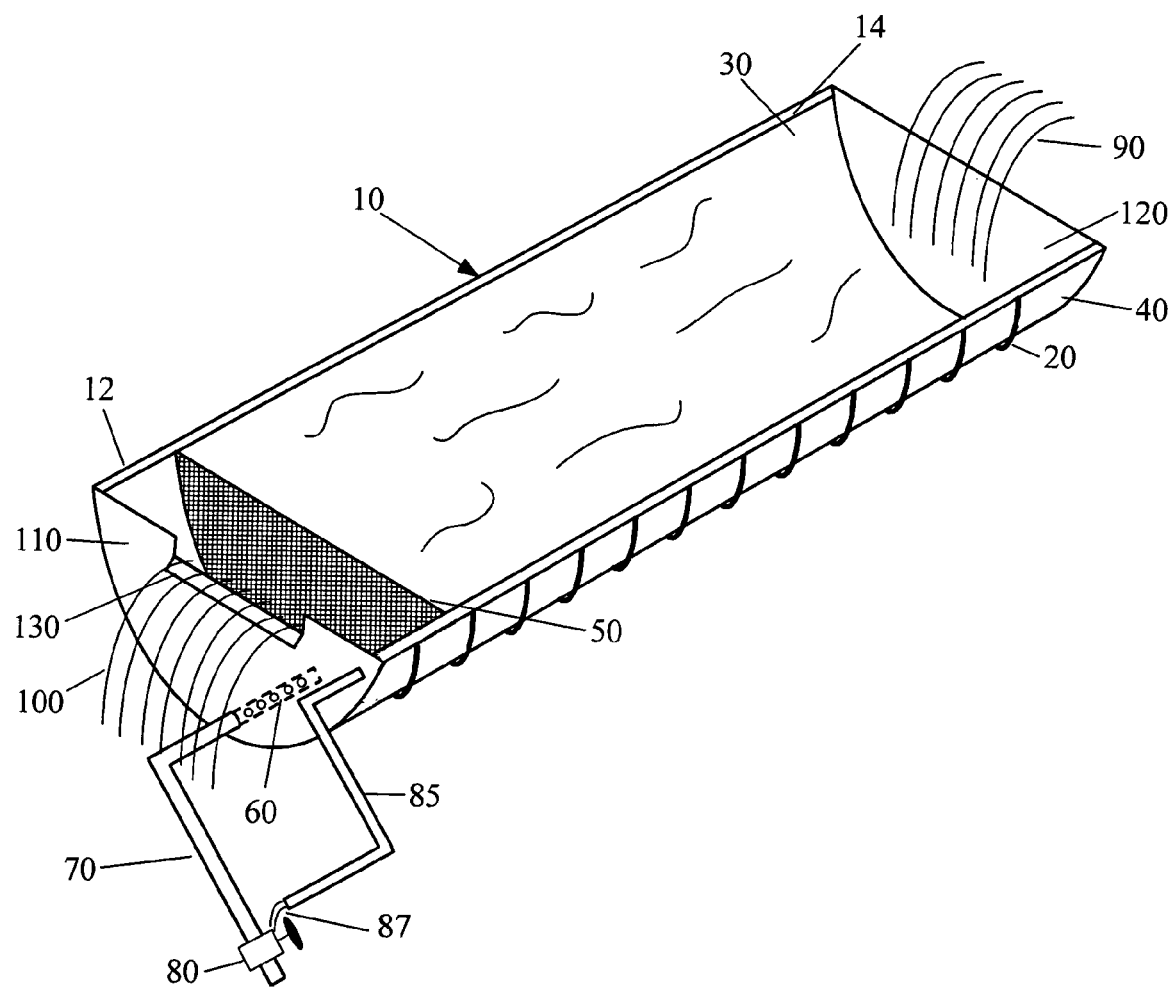

This patent application claims priority to provisional patent application 60/897,078 filed on Jan. 24, 2007 which is incorporated by reference herein.

STATEMENT OF GOVERNMENT INTEREST

This invention has been made with U.S. Government support under federal grant number USDA 2002-38500-12056. The Government has certain rights in the invention.

BACKGROUND

Raceways are common configurations used in conventional aquaculture industries. While providing a continuously flowing stream of naturally oxygenated water for the aquatic animals, certain raceways configurations are not without problems. For example, in concrete raceways having rectangular cross-sections, the solid waste produced by the animals is labor intensive to remove. The concrete walls are also abrasive to the extremities of fish which are often grown in the raceways. Flexible liners used to provide a buffer against the concrete walls often meet with their own design difficulties such as degradation due to exposure to atmospheric elements such as sunlight. Also, the moving water stream in the raceway can lift the liner and effectively reduce the volume available within the raceway.

Aquaculture systems using raceways having a U-shaped or semi-circular cross section benefit from reduced labor in waste removal from the raceway since the shape facilitates both natural and manual sweeping of the waste from the walls of the raceway towards a center drain pipe running longitudinally along the bottom of the raceway.

SUMMARY OF THE INVENTION

The invention described herein facilitates waste removal from U-shaped or semi-circular cross-section raceways by providing a waste removal section at the downstream end of the raceways whereby the waste removal section is separated from the rest of the raceway by a vertical or near vertical screen. The mesh size of the screen is sufficient for the waste to pass through but not allow the aquatic animals to pass through. The natural flow of water through the raceway carries the waste material downstream within the raceway. The screen segregates a waste removal section from the rest of the raceway as mentioned above. A perforated pipe positioned in the bottom of the waste removal section running along the same longitudinal axis of the raceway provides the outlet for the waste removal. A waste control valve connected to the perforated pipe controls the flow of the waste out of the waste removal section due to hydrostatic pressure of the water level in the raceway. In one, embodiment, the valve remains closed until the waste is desired to be removed. The segregation of the waste removal section and the aquatic animals helps to minimize disease in the animals. Also, since the labor required to clean the waste from the raceways is reduced in the semi-circular or U-shaped cross-section raceways, personnel are more likely to remove the waste from the raceways thereby further increasing the health potential of the animals. The semi-circular or U-shaped cross-sectional shape also facilitates the accumulation of waste in close proximity to the pipe at the bottom of the raceway for enhanced efficiency in removing waste from the raceway through gravity induced hydrostatic pressure when the valve connected to pipe is opened. In such a cross-section raceway, the waste products tend to naturally slide from the walls of the raceway towards the low point in the raceway where the perforated pipe is positioned parallel to the longitudinal axis of the raceway.

Another advantage of the current invention over other raceway configurations is the ease of installation and flexibility in length. One embodiment of the current invention uses a plastic half-pipe to form the semi-circular shaped cross-section. The plastic half-pipe is relatively light-weight compared to concrete structure raceways and is much less labor intensive to install and maintain. In one embodiment, the half-pipe is one-half of a commercially available, large plastic drain pipe that has been cut along is longitudinal axis to form two half-pipes which greatly improves manufacturability and economics of the product compared to conventional raceway construction. One non-limiting, illustrative example of such a drainage pipe is Advanced Drainage Systems, Inc. N12 smooth interior pipe. The half-pipe is easily cut to the desired length needed for a particular installation. The half-pipe may be constructed using double-wall material whereby the inner surface is smooth and the outer surface is corrugated. This design has the advantages of increased leak protection due to the double wall, increased strength due to the corrugations, and enhanced thermal insulation provided by an air-filled gap between the inner and outer walls. In at least one embodiment, the raceway is a single piece construction of a plastic half-pipe with semi-circular end plates plastic welded in place on each end of the half-pipe. Thermal insulation material such as but not limited to a foam-based insulation may be positioned between the inner and outer walls to protect the water in the raceway from the ambient temperature.

In another embodiment of the invention, the downstream end plate (weir plate) is designed to include a weir to provide overflow from the raceway, often into another raceway at a lower level. The weir not only controls the water flow, but also helps to re-oxygenate the water as it exits one raceway and enters the next.

An optional feature of one embodiment of the invention is a pipe to provide a steady flow of raceway water over the waste control valve to provide antifreeze protection in cold weather. This device drains a small volume flow of water from the raceway downstream end plate through a pipe which directs the water onto the external surface of the waste control valve. The pipe may be thermally insulated to help prevent freezing of the water within the pipe.

Another optional feature of one embodiment is to position a valve in series with the perforated pipe such that the valve is located inside the raceway, submerged beneath the water surface. An elongated handle extends from the valve to above the water surface whereby an operator may open or close the valve to clean the waste from the waste removal section without having to reach into the water within the raceway. Such a positioned valve provides freeze protection for the valve in cold weather.

BRIEF DESCRIPTIONS OF THE DRAWINGS

FIG. 1: Aquaculture Raceway Having a Semi-circular Cross-section with Waste Removal Section FIG. 2: Aquaculture Raceway System Using a Plurality of Semi-circular Cross-section Raceways FIG. 3: Detailed Side-View of Waste Removal Section of Semi-circular Cross-section Raceway

DETAILED DESCRIPTION OF THE DRAWINGS

One embodiment of the aquaculture raceway 10 having a U-shaped or semi-circular cross-section with a waste removal section 12 is illustrated in FIG. 1. The aquaculture raceway 10 is formed with an outer wall 40 having longitudinally spaced corrugations 20 and a smooth inner wall 30. Typically there is a gap or space 14 between the inner wall 30 and outer wall 40 whereby the space 14 is filled with air or other material such as foam to provide thermal insulation between the inner wall 30 and outer wall 40. A screen 50 is positioned upstream of the weir plate 110 to provide a waste removal section 12 whereby the waste produced by the aquatic animals 18 (FIG. 3) and uneaten food will accumulate within the waste removal section 12 due to the natural flow of water 17 within the aquaculture raceway 10. Depending on the aquatic animals being raised in the raceway 10, the screen mesh is of the proper size to permit the waste to pass through but not the aquatic animals 18. Typical mesh size openings of the screen 50 are, but not limited to, 0.125", 0.25", 0.50", 0.75" and 1".

Figure 2:
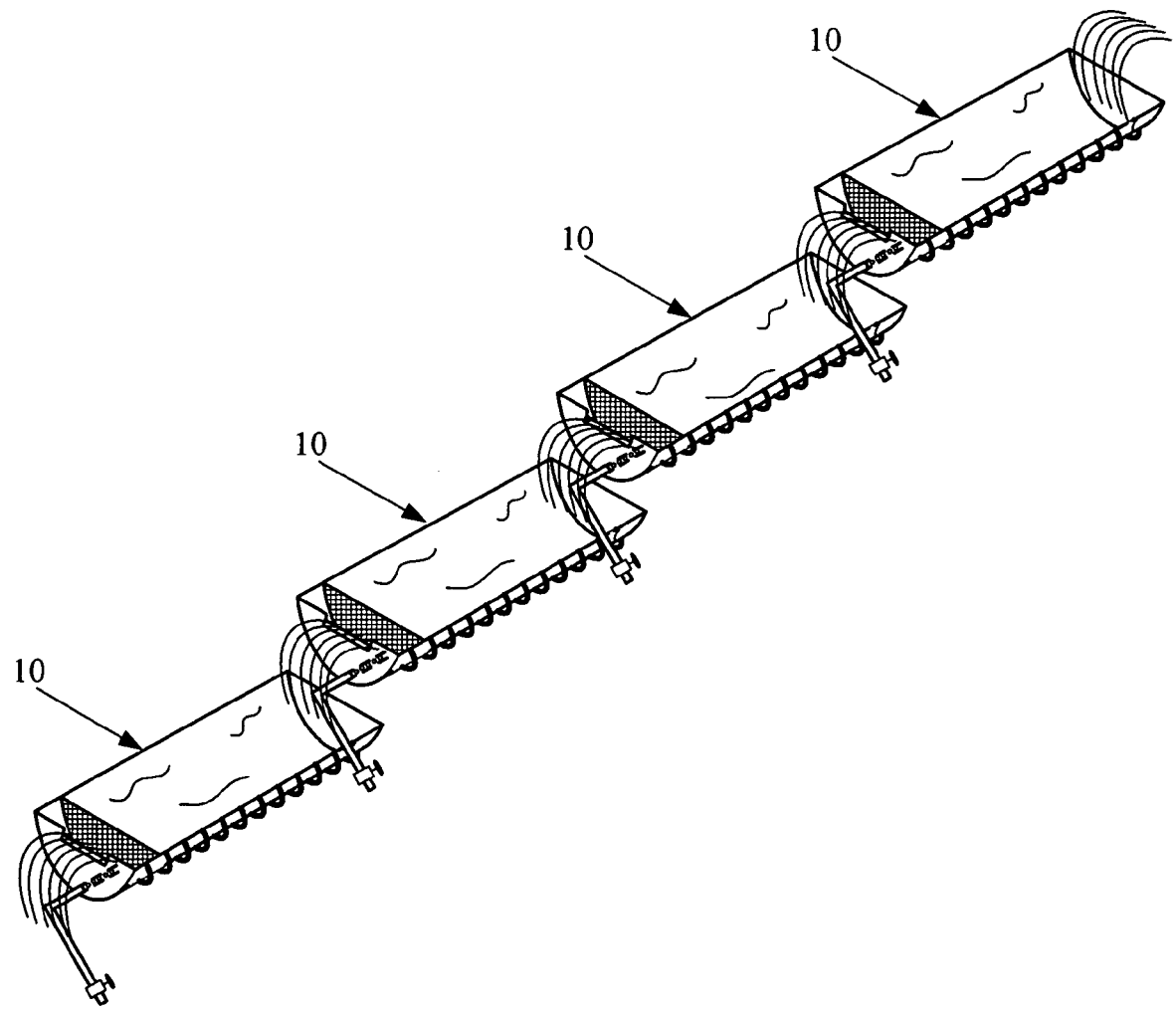

Entering water 90 flows into the aquaculture raceway 10 and exiting water 100 flows out of the raceway 10 at opposite ends of the raceway 10. The exiting water 100 flows over a weir 130 upon exiting which helps to guide the water into a downstream raceway as is shown in FIG. 2. As shown in FIG. 2, a plurality of raceways 10 may be configured with the water flowing from one to the next, each successive raceway at a slightly lower elevation than the previous raceway. As the exiting water 100 flows past the weir 130 and becomes the entering water 90 to a downstream raceway, the water is naturally oxygenated providing a suitable habitat for the aquatic animals 18 within the raceways 10. Opposite of the weir plate 110 of the raceway 10 is an end plate 120 to compete the raceway 10 wall structure.

Figure 3:
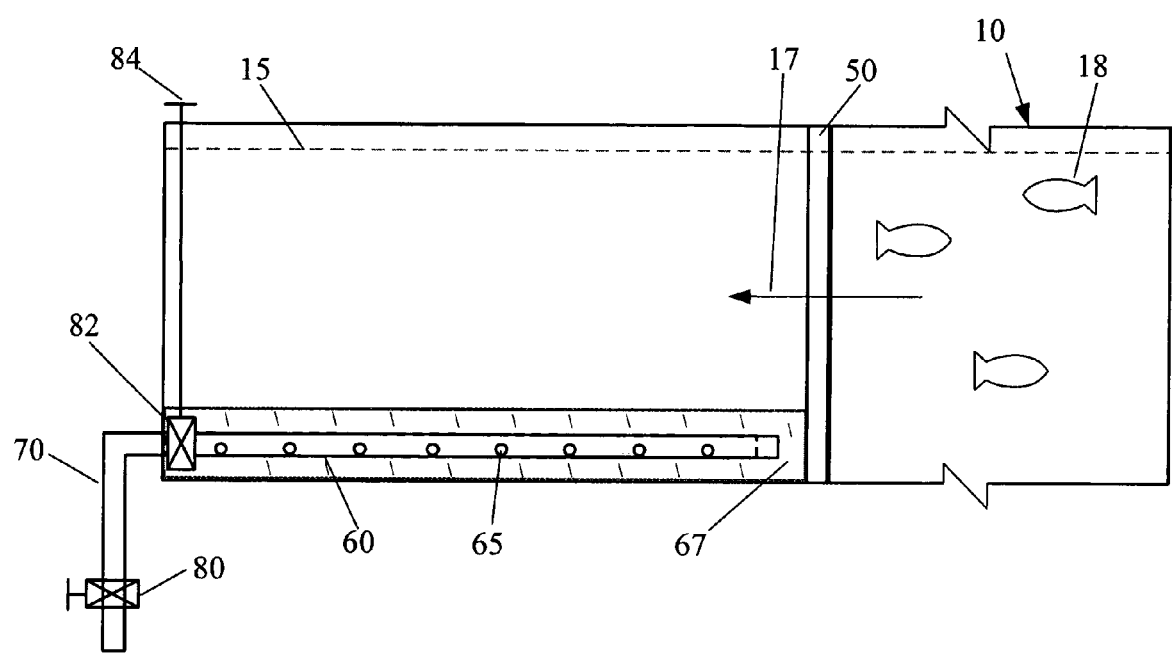

The typical water level 15 within a raceway is shown in FIG. 3. Along the bottom of the raceway 10 within the waste removal section 12 is positioned a pipe 60 with a plurality of perforations 65. The perforated pipe 60 is positioned so that the longitudinal axis of the pipe is parallel to the longitudinal axis of the raceway 10 to facilitate waste collection near the pipe 60. The perforated pipe 60 is connected to a solid walled pipe 70 which is further connected to a valve 80. Opening of the valve 80 hydrostatically forces the waste 67 accumulated in the bottom of the raceway 10 in the waste removal section 12 to flow into the perforated pipe 60, through the solid walled pipe 70 and out of the system through the valve 80. In at least one embodiment, the valve 80 is positioned inside the raceway 10 and submerged below the water level 15 to protect the water in valve 80 from freezing. In one embodiment of the invention, the inner wall of the waste removal section 12 may be manually swept towards the bottom to further assist in effective waste removal. As an optional feature to help avoid freezing of the water in the valve during cold weather, a trickle pipe 85 may be installed to provide a small flow rate of water 87 to flow over the valve. The trickle pipe 85 is installed through the weir plate 110 a few inches below the water surface 15. The trickle pipe 85 may be thermally insulated to help prevent the water flow 87 from freezing.

Another optional feature is to position a valve 82 in series with the perforated pipe 60 such that the valve 82 is located inside the raceway 10, submerged beneath the water surface 15. An elongated handle 84 extends from the valve 82 to above the water surface 15 whereby an operator may open or close the valve to clean the waste 67 from the waste removal section 12 without having to reach into the water within the raceway. Such a positioned valve provides freeze protection for the valve in cold weather.

The various embodiments described herein are merely descriptive of the present invention and are in no way intended to limit the scope of the invention. Modifications of the present invention will become obvious to those having skill in the art in light of the detailed description herein, and such modifications are intended to fall within the scope of the appended claims.

What is claimed:

1. An aquaculture raceway for aquatic animals having a longitudinal axis, an upstream end, a downstream end, and a bottom comprising:
    a semi-circular cross section having a smooth inner wall and a corrugated outer wall;
    a space between the inner wall and outer wall;
    a semi-circular cross-section waste removal section near the downstream end of the raceway and aligned with the raceway longitudinal axis;
    a screen separating the waste removal section and an upstream portion raceway;
    a perforated pipe positioned along the bottom of the raceway within the waste removal section such that the longitudinal axis of the pipe is parallel to the longitudinal axis of the raceway; and
    a valve connected to the perforated pipe such that when the valve is opened, waste accumulated within the waste removal section is forced by gravity into the perforated pipe and flows through the valve to exit the raceway.

2. The aquaculture raceway in claim 1 further comprising a weir plate on the downstream end.

3. The aquaculture raceway in claim 1 wherein the valve is submerged inside the waste removal section of the raceway.

4. The aquaculture raceway in claim 1 wherein the space between the inner and outer wall is at least partially filled with thermal insulation.

5. The aquaculture raceway in claim 1 further comprising a trickle pipe to slowly drain water from the raceway onto the valve.

6. The aquaculture raceway in claim 1 wherein the inner wall and outer wall are made of plastic material.

7. The aquaculture raceway in claim 1 wherein the raceway comprises a plastic half-pipe cut from a section of plastic pipe.

8. An aquaculture raceway system for growing aquatic animals comprising:
    a plurality of semi-circular cross section raceways through which water flows from a first raceway to a last raceway through any number of intervening raceways, each successive raceway positioned at a lower elevation than the previous raceway;
    each raceway having a longitudinal axis and an upstream end and a downstream end with respect to the water flow direction;
    each raceway having a smooth inner wall and a weir plate on the downstream end whereby water exits each raceway through a weir in the weir plate;
    each raceway further comprising a screen near the weir plate to segregate a waste removal section from an upstream portion of the raceway such that the waste removal section is between the weir plate and the screen whereby the waste removal section comprises a semi-circular cross section having a longitudinal axis aligned parallel to the raceway longitudinal axis;
    the screen comprising a mesh size selected to prohibit passage of the aquatic animals through the screen;
    a perforated pipe positioned along the bottom of each raceway within the waste removal section, the perforated pipe aligned parallel with the raceway longitudinal axis; and
    a valve connected to each perforated pipe in such that when the valve is opened, waste accumulated within the waste removal section is forced by gravity into the perforated pipe and flows through the valve.

9. The raceway system of claim 8 wherein each raceway further comprises a corrugated outer wall with a space between the inner wall and outer wall.

10. The raceway system in claim 9 wherein the space between the inner and outer wall is at least partially filled with thermal insulation.

11. The raceway system of claim 8 wherein each raceway is made of plastic material.

12. The raceway system of claim 8 wherein each raceway comprises a plastic half-pipe cut from a section of plastic pipe.

13. The raceway system of claim 8 wherein each raceway further comprises a trickle pipe to slowly drain water from the raceway onto the valve.

14. An apparatus for raising aquatic animals comprising:
   a semi-circular cross section raceway, having a smooth inner wall, a corrugated outer wall, a longitudinal axis, an end plate and a weir plate;
   water flows within the raceway from the end plate towards the weir plate;
   a screen positioned approximately orthogonal to the longitudinal axis of the raceway near the weir plate to form an animal waste removal section downstream of the screen and upstream of the weir plate wherein the mesh size of the screen is selected to allow waste to pass through the screen but not the aquatic animals;
   the waste removal section comprises a semi-circular cross-section having a longitudinal axis aligned parallel with the raceway longitudinal axis;
   a pipe positioned along the bottom of the raceway within the waste removal section, aligned parallel with the raceway longitudinal axis, and extending outside of the raceway wherein the pipe has perforated walls within the waste removal section;
   a valve connected to the pipe such that when the valve is open, the animal waste near the bottom of the raceway enters the pipe through the perforated walls and is transported by gravity out of the raceway by the pipe; and
   the weir plate further comprises a weir for water to flow out of the raceway.

15. The apparatus in claim 14 further comprising a trickle pipe to slowly drain water from the raceway onto the valve.

16. The apparatus in claim 14 wherein the inner wall and outer wall are made of plastic material.

17. The apparatus in claim 14 wherein the raceway comprises a plastic half-pipe cut from a section of plastic pipe.

18. An apparatus for raising aquatic animals comprising:
   a single piece, semi-circular crass section raceway, having a longitudinal axis, a smooth inner wall, an end plate and a weir plate;
   water flows within the raceway from the end plate towards the weir plate;
   a screen positioned near the weir plate to form an animal waste removal section downstream of the screen and upstream of the weir plate;
   the weir plate further comprises a weir for water to flow out of the raceway; and
   a perforated pipe positioned within the waste removal section and aligned parallel with the raceway longitudinal axis to remove waste from the raceway.

19. The apparatus in claim 18 further comprising a valve connected to the perforated pipe to control removal of the waste.

20. The apparatus of claim 18 where the mesh size of the screen is on the order of 0.25 inch.

21. The apparatus of claim 18 where the mesh size of the screen is on the order of 0.75 inch.

* * * * *